UNITED STATES PATENT OFFICE.

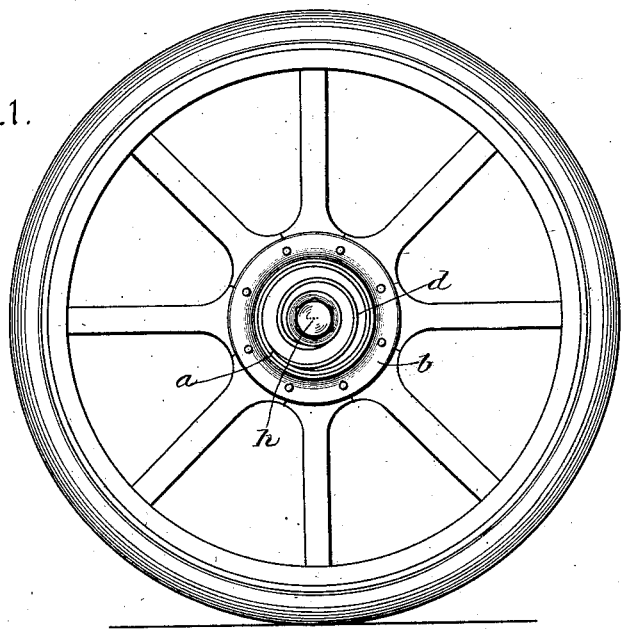
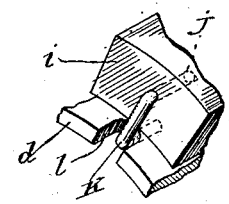
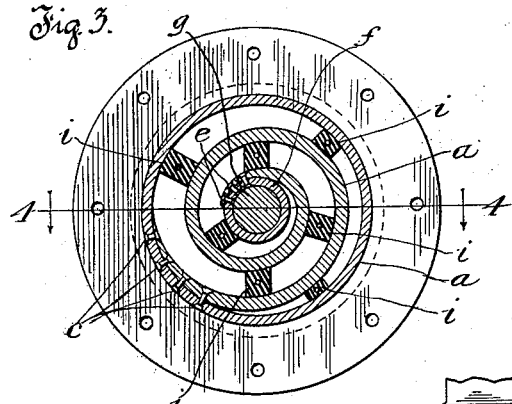
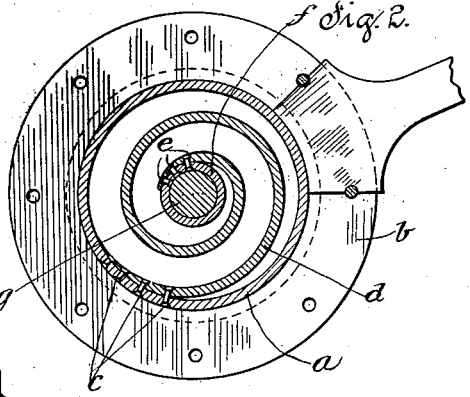
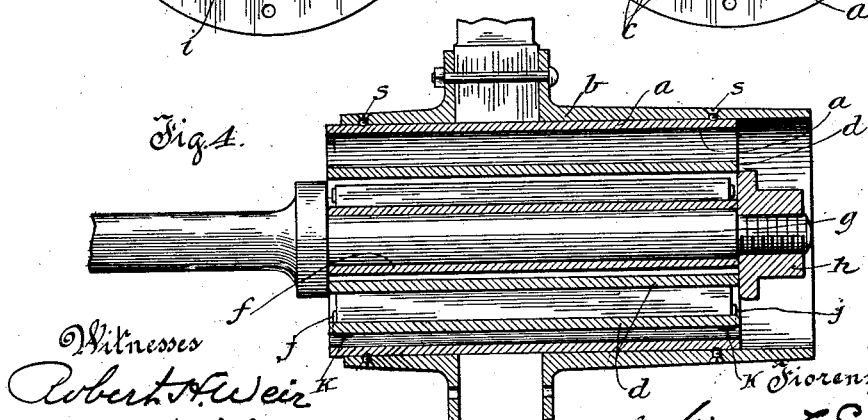

FIORENZO GAMBARINI, OF CHICAGO, ILLINOIS.

WHEEL-HUB.

1,077,928. Specification of Letters Patent. Patented Nov. 4, 1913.

Application filed May 5, 1913. Serial No. 765,478.

*To all whom it may concern:*

Be it known that I, FIORENZO GAMBARINI, a subject of the King of Italy, residing at Chicago, in the county of Cook and State of Illinois, have invented a new and useful Wheel-Hub, of which the following is a specification.

My invention relates to improvements in hubs for vehicle wheels and its object is to provide a hub for such wheels which will be spring-yielding on the axle and so obviate the shocks and jars incident to vehicles when in motion. I attain this object by the mechanism illustrated in the accompanying drawings, in which—

Figure 1 is a view of a wheel to which my hub has been applied; Fig. 2 is a larger view of the hub; Fig. 3 is a view similar to Fig. 2 showing a modification of my invention; Fig. 4 is a section taken on the line 4—4 of Fig. 3 and Fig. 5 is a detail view showing the method of attaching the rubber strips to the spring.

Similar letters refer to similar parts throughout the several views.

My hub consists of an outer metallic cylinder $a$ which may be made of any desired diameter so as to adapt it to be fitted tightly within the spoke-holding part $b$ of any vehicle wheel, to which part $b$ said outer cylinder $a$ may be attached by the screws $s$. To this outer cylinder $a$ is attached by rivets $c$ one end of a metallic spiral spring $d$, the other end of which spiral spring is attached by rivets $e$ to an inner metallic cylindrical sleeve $f$, through which the axle $g$ passes. The hub rotates on said axle $g$ and is held in place on it by the nut $h$, attached to the end of said axle $g$, or by other suitable means.

While my invention can be used as above described, I prefer to further strengthen it by attaching strips of rubber $i$ to the spiral spring $d$ in various places, as illustrated in Figs. 3 and 4, so that said strips of rubber $i$ will fit closely between the convolutions of said spiral spring $d$ and tend to hold said spring in its original position and prevent bending or breaking of it. Said strips of rubber $i$ may be attached to said spring $d$ by means of wires $j$ passing through said strips $i$ and having their projecting ends $k$ bent either downwardly or upwardly through recesses $l$ formed in the edges of the spring $d$.

It will be apparent that a hub made in accordance with my invention may be made of any desired size so as to be fitted in any kind of a vehicle wheel and that such hub may be cheaply and quickly fitted in any wheel.

Having now described my invention, what I claim as new and desire to secure by Letters Patent is,

A hub for a vehicle wheel consisting of an outer cylinder adapted to be attached to the spoke-bearing portion of a wheel, an inner cylinder adapted to rotate on the axle of the wheel, a spiral spring attached at one end to said outer cylinder and at the other end to said inner cylinder, a plurality of strips of rubber disposed transversely between the convolutions of said spring, wires passing through said strips, the projecting ends of which wires are bent, and recesses formed in the edges of said spring adapted to receive the bent ends of said wires and thereby hold said strips securely in place, substantially as described.

FIORENZO GAMBARINI.

Witnesses:
JAMES B. DEVITT,
ERNEST M. WOLL.

Copies of this patent may be obtained for five cents each, by addressing the "Commissioner of Patents, Washington, D. C."